United States Patent [19]

Holmes et al.

[11] Patent Number: 4,958,980
[45] Date of Patent: Sep. 25, 1990

[54] QUICK CONNECT/DISCONNECT WHEEL CRADLE ARRANGEMENT FOR WHEEL LIFT TOWING SYSTEMS

[75] Inventors: Gerald E. Holmes, Chattanooga, Tenn.; Fleming V. Cannon, Jr., Flintstone, Ga.

[73] Assignee: Century Wrecker Corporation, Ooltewah, Tenn.

[21] Appl. No.: 268,562

[22] Filed: Nov. 7, 1988

Related U.S. Application Data

[62] Division of Ser. No. 152,517, Feb. 5, 1988, abandoned.

[51] Int. Cl.⁵ .................................................. B60P 3/12
[52] U.S. Cl. .................................... 414/563; 280/457; 280/402
[58] Field of Search ................. 414/563; 280/402, 457

[56] References Cited

U.S. PATENT DOCUMENTS

| | | | |
|---|---|---|---|
| 3,182,829 | 5/1965 | Wagner | 414/563 |
| 3,690,482 | 9/1972 | Gaumont | 414/563 |
| 4,384,817 | 5/1983 | Peterson | 414/563 |
| 4,473,334 | 9/1984 | Brown | 414/563 |
| 4,487,396 | 12/1984 | Hoffman | 414/563 X |
| 4,498,835 | 2/1985 | Yasue et al. | 414/463 |
| 4,573,857 | 3/1986 | Porter, Sr. et al. | 414/563 |
| 4,616,970 | 10/1986 | Lewis | 414/563 |
| 4,637,623 | 1/1987 | Bubik | 280/402 |
| 4,679,978 | 7/1987 | Holmes et al. | 414/563 |
| 4,737,066 | 4/1988 | Allison, Jr. | 414/563 |
| 4,741,661 | 5/1988 | Carey | 414/563 |
| 4,743,158 | 5/1988 | Hodges | 414/563 |
| 4,759,683 | 7/1988 | Hodges | 414/563 |
| 4,761,111 | 8/1988 | Brown | 414/563 |
| 4,775,285 | 10/1988 | Zackovich | 414/563 |
| 4,793,763 | 12/1988 | Bubik | 414/563 |
| 4,840,534 | 6/1989 | Totty | 414/563 |

OTHER PUBLICATIONS

AATAC Hydraulic Wreckers Slideback Carriers Catalog–copyright AATAC 1986.

Primary Examiner—David A. Bucci
Attorney, Agent, or Firm—Brooks & Kushman

[57] ABSTRACT

Wheel cradles for a wheel lift towing system are quickly and easily coupled to or uncoupled from opposing ends of a cross arm assembly associated with a towing vehicle. The cradles are coupled to the cross arm by sliding the cradles laterally in a substantially horizontal plane from outside the ends of the cross arm. Such lateral insertion facilitates coupling of the wheel cradles to the cross arm in situations of difficult access to the towed vehicle's wheels, for example, when the towed vehicle is positioned with two of its wheels abutting a curb. An arrangement for coupling a back-up safety line, such as a safety chain, between the towing and towed vehicles provides additional protection against accidental dislodgement of the towed vehicle from the towing vehicle.

12 Claims, 5 Drawing Sheets

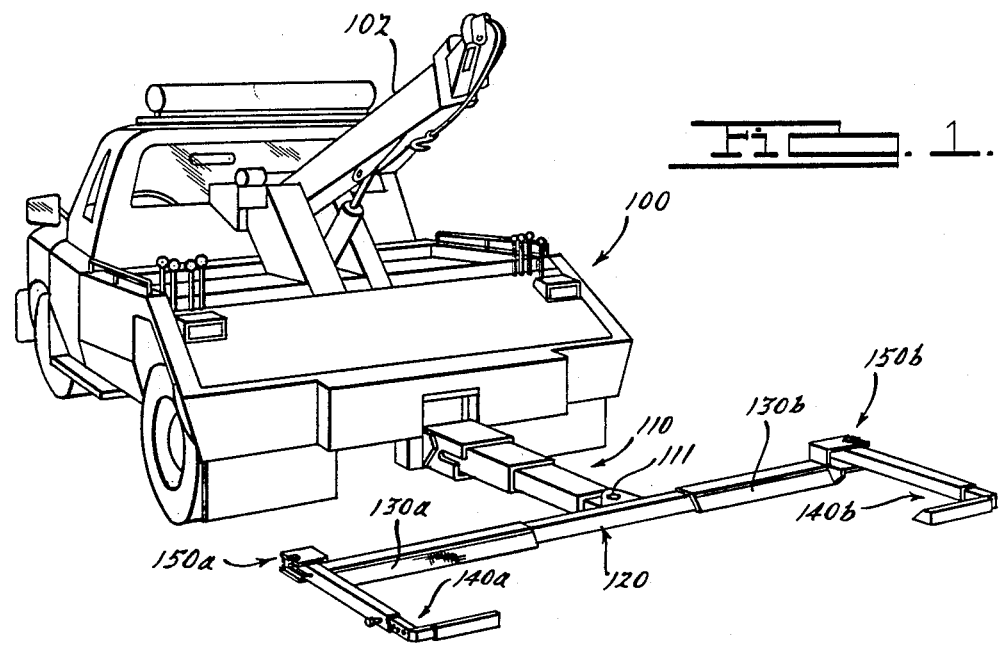
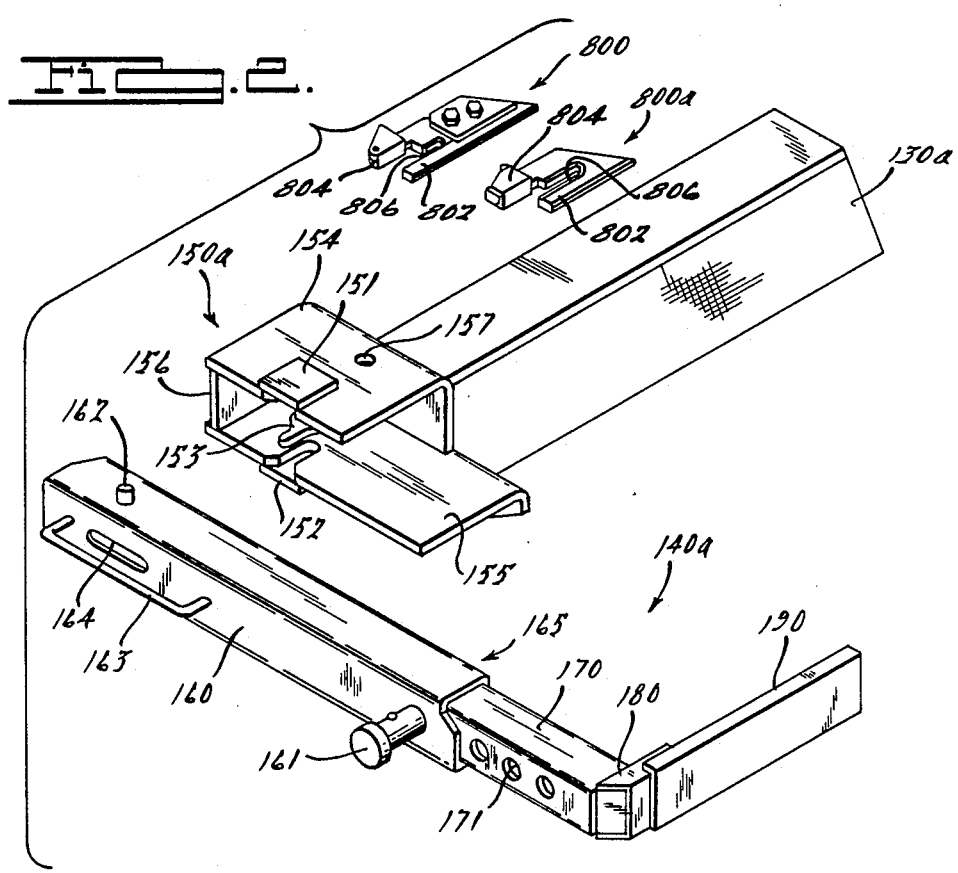

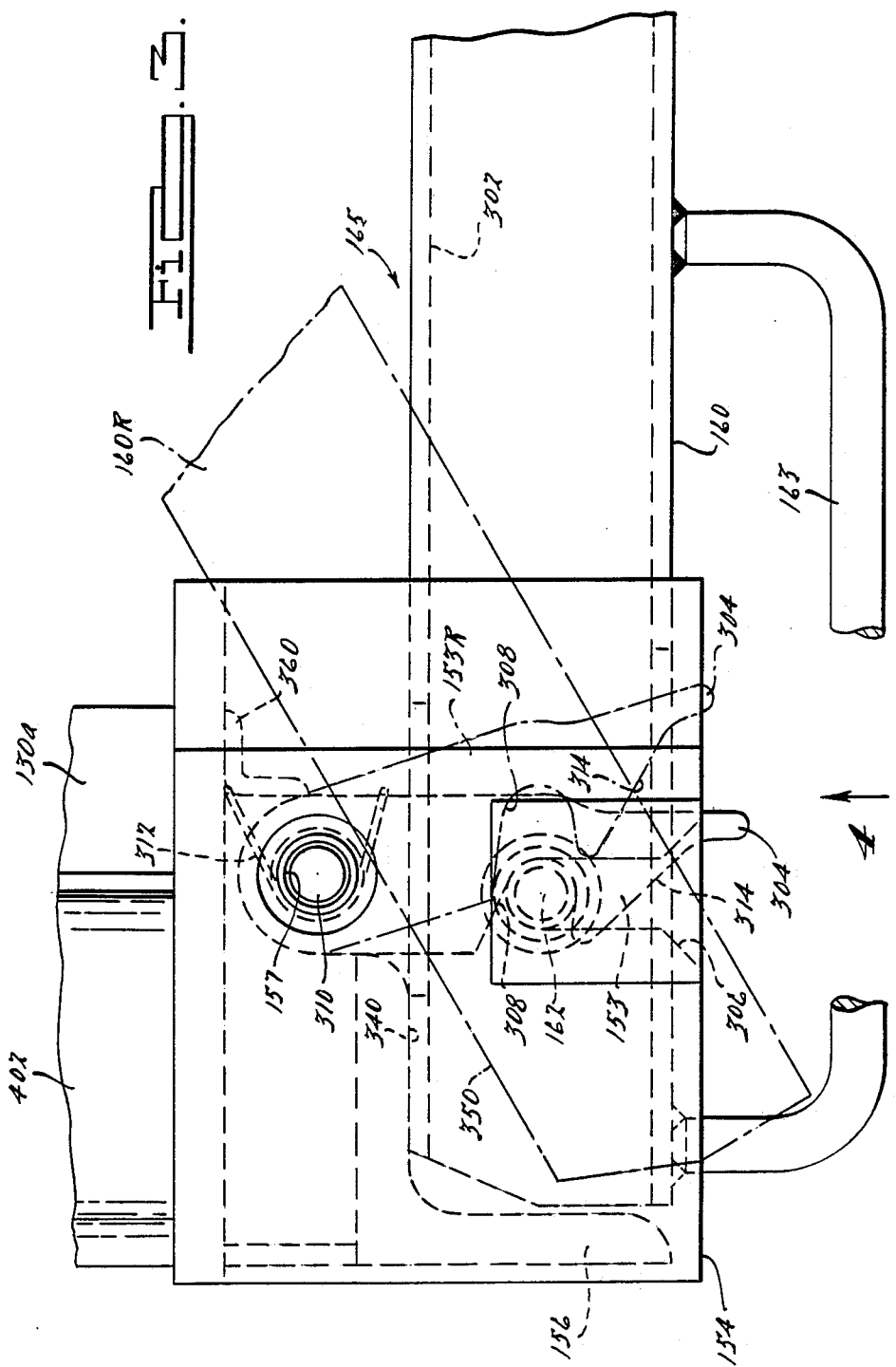

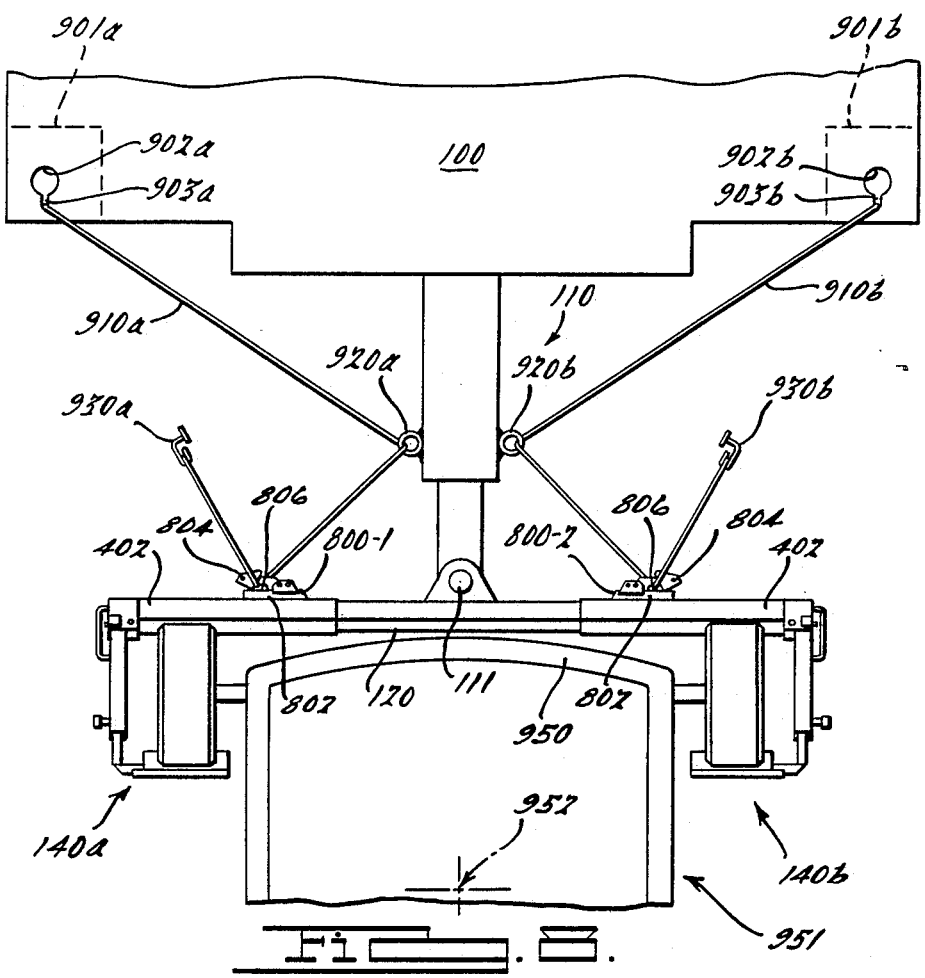

QUICK CONNECT/DISCONNECT WHEEL CRADLE ARRANGEMENT FOR WHEEL LIFT TOWING SYSTEMS

This is a division of U.S. patent application Ser. No. 152,517, filed Feb. 5, 1988, now abandoned and assigned to the same assignee as this invention.

BACKGROUND OF THE INVENTION

The invention relates generally to wheel engaging apparatus for use with vehicle towing systems. More specifically, the invention concerns wheel cradles for towing systems wherein the towed vehicle is lifted and towed principally by its wheels.

The concept of using detachable, inwardly facing L-shaped wheel cradles in a wheel lift towing system was first introduced in U.S. Pat. No. 4,679,978-Holmes et al., assigned to the same assignee as this invention. So-called "wheel lift" towing approaches avoid the need for the conventional tow truck sling assembly by using wheel engaging structures or "wheel cradles" which engage the front or rear wheels of a vehicle to be towed to lift the wheels and therefore one end of the vehicle substantially without engaging any other portion of the vehicle. The '978-Holmes et al. patent disclosed such a wheel lift tow assembly mounted to the frame at the rear of a tow vehicle and moveable vertically. The tow assembly of the Holmes et al. disclosure included a telescopic tow bar extended and retracted from the rear of the vehicle and a cross arm pivotally mounted intermediate its end about an upwardly extending axis to a rear portion of the telescopic tow bar. L-shaped wheel cradles were releasably connected to end portions of the cross arm in the Holmes et al. patent.

U.S. Pat. No. 4,637,623-Bubik discloses a later version of a wheel lift towing assembly using substantially L-shaped removable wheel cradles having the capability for pivoting in a horizontal plane from a laterally remote position spaced outwardly from the sides of the vehicle to be towed.

However, the Bubik arrangement requires insertion of the wheel cradle into coupling devices associated with the cross arm in a direction substantially perpendicular to a longitudinal axis of the cross arm—i.e., in a direction substantially parallel to the longitudinal axis of the towed vehicle. This required insertion approach makes cradle attachment to the cross arm of the towing vehicle difficult when obstructions prevent adequate clearance immediately adjacent the outside lateral surfaces of the wheels to be engaged.

While known systems employ insertion of the wheel cradle parallel to a longitudinal axis of the cross arm, such systems utilize an extra cradle side arm extension extending parallel to the cross arm axis for insertion into a cross arm slot. Furthermore, in such known systems, the wheel cradle is not adjustable to a plurality of angular positions relative to the crossbar.

Additionally, there is seen to be a need for a convenient back-up safety line arrangement for providing additional coupling security between towing and towed vehicles.

SUMMARY OF THE INVENTION

Accordingly, it is an object of this invention to furnish apparatus enabling facile connection and disconnection of a wheel cradle from the cross arm of a wheel lift towing system.

In a wheel lift towing system associated with a towing vehicle, towed wheel engaging apparatus comprises a cross arm assembly coupled to the towing vehicle and having first and second portions for engaging respective first portions of circumferentially extending road engaging surfaces of first and second wheels of a vehicle to be towed. First and second wheel cradle members each having a side arm assembly coupled to a transversely extending wheel engaging shoe member for engaging respective second portions of the circumferentially extending surfaces are coupled to the cross arm assembly via first and second coupling members at opposite ends of the cross arm assembly such that each wheel cradle member may be releasably coupled to its respective cross arm assembly end via a lateral sliding action of the side arm assembly substantially parallel to a longitudinal axis of the cross arm assembly while the side arm assembly extends transversely to said longitudinal axis, thereby placing the side arm assembly adjacent an outer side surface of a towed wheel. Each of the first and second coupling members include sockets on one of an end of the cross arm assembly and an end of the side arm assembly, each socket including an opening shaped for receipt of one of a lateral peripheral surface of an assoiacted side arm assembly and an end portion of the cross assembly.

Additionally, the invention contemplates an arrangement for coupling a back-up safety line, or chain, between the towing and towed vehicles. The arrangement includes at least one storage compartment in the towing vehicle having an aperture therein for lengthwise receipt of an unused portion of a safety line. A guide element is coupled to the tow bar and has a central aperture through which the safety line is routed. A safety line latch is coupled to the cross arm for receipt of the safety line at a predetermined position along its length after a free end of the safety line has been coupled to the towed vehicle chassis.

BRIEF DESCRIPTION OF THE DRAWINGS

These and other objects and features of the invention will become apparent from the reading of a detailed description taken in conjuction with the drawings, in which:

FIG. 1 is a perspective view taken from the rear of a towing vehicle showing the general environmental use of wheel cradles designed in accordance with the principles of the invention;

FIG. 2 is an exploded perspective view of a wheel cradle assembly designed in accordance with the principles of the invention;

FIG. 3 is a top plan view of a socket for quick connect and disconnect of the wheel lift system wheel cradles;

FIG. 8 is a top plan view of a routing arrangement for safety lines, or chains, coupling the towing and towed vehicles in accordance with the principles of the invention.

DETAILED DESCRIPTION

Figure 4:
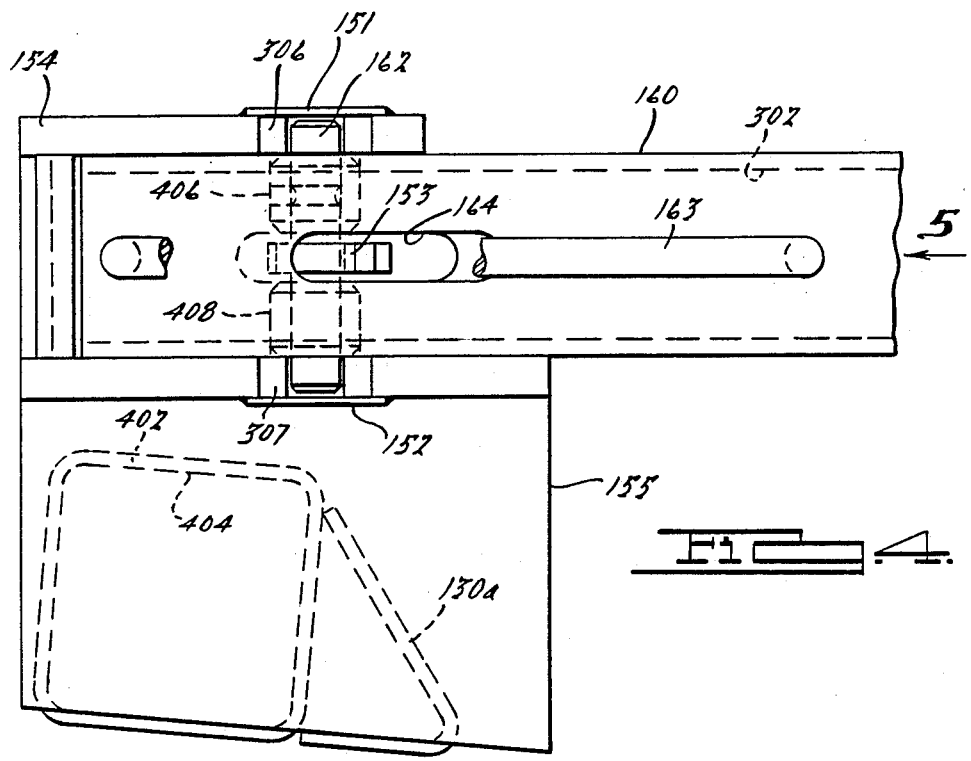
FIG. 4 is a side view taken along arrow 4 of FIG. 3.

A typical wheel lift towing system with which the apparatus of the invention may conveniently be used is set forth in FIG. 1. Low rear end profile tow truck 100 includes an optional conventional boom with a cable and winch assembly 102 which is neither necessary nor pertinent to the invention. However, many present day tow trucks continue to employ such a conventional boom in addition to a tow-bar lift system.

Extending from the bottom of the truck chassis at its rear end is a telescoping tow bar or "stinger" 110 as disclosed, for example, in U.S. Pat. No. 4,679,978-Holmes et al. referenced above. Coupled to a rear end of tow bar 110 via a vertically extending pivoting axis 111 is a cross arm assembly 120. Cross arm assembly 120 carries at its opposed ends approach plates 130a and 130b which are backed into abutting engagement with two wheels of the vehicle to be towed. Coupled to each end of the cross arm assembly 120 adjacent to approach plates 130a and 130b are substantially L-shaped wheel cradle assemblies 140a and 140b. Cradle assemblies 140a and 140b are removably coupled to cross arm assembly 120 via respective socket assemblies 150a and 150b which, in the illustrative embodiment, are welded to end portions of approach plates 130a and 130b and to an outer tube portion of cross arm assembly 120 adjacent approach plates 130a and 130b.

Wheel cradle assembly 140a of FIG. 1 is shown in an exploded perspective view in FIG. 2. As seen from FIG. 2, wheel cradle assembly 140a is comprised of a side arm assembly 165 extending transversely of cross arm assembly 120 and coupled at its end remote from the cross arm assembly via a shoe reinforcing gusset or plate 180 to a wheel engaging shoe 190. Side arm assembly 165 includes an outer tube 160 surrounding for telescopic sliding engagement therewith an inner tube portion 170 which is welded to gusset 180. Gusset 180, in turn, is welded to wheel engaging shoe 190. Side arm assembly 165 additionally includes a handle 163 which extends over a latch release lever access window 164. Outer tube 160 of side arm assembly 165 additionally carries a vertically disposed latch engaging pin 162, the top portion of which is seen extending from a top surface of outer tube 160 in FIG. 2. The length of side arm assembly 165 is discretely adjustable by sliding inner tube 170 away from cross arm assembly 120 and locked into any one of a plurality of adjustable positions by releasing plunger pin 161 for engagement with one of a plurality of adjusting holes 171 formed in inner tube 170.

The cradle assembly is removably coupled to an end of cross arm assembly 120 adjacent approach plate 130a via a socket assembly 150a. Socket 150a is comprised of a top angle member 154, a base angle member 155 and a center angle 156 interconnected as shown to form a substantially rectanguloid socket having laterally and rearwardly facing openings for sliding receipt in a laterally inward direction of the near end of outer tube 160. When slid laterally inwardly of socket assembly 150a, the latch engaging pin 162 of outer tube 160 of side arm assembly 165 engages a latch 153 carried within the socket assembly 150a for coupling of the wheel cradle assembly to the end of the cross arm assembly 120. Vertically aligned slots in top angle member 154 and base angle member 155 receive end portions of latch engaging pin 162 and are closed to the exterior of the socket via cover plates 151 and 152, respectively. Latch 153 is pivotally mounted within socket 150a via a vertically extending latch pivot pin held in mounting holes in the top angle member 154 and the base angle member 155. Mounting hole 157 for the latch pivot pin is shown in FIG. 2 in top angle member 154.

When assembled to cross arm 120, the window 164 of outer tube 160 is positioned such that an end portion of latch 153 will protrude through window 164 for manual access to latch 153 for rotating it out of the locked position for quick release of wheel cradle assembly 140a.

Additionally shown in the exploded perspective view of FIG. 2 are two alternative embodiments for a flexible safety line or chain latch shown at 800 and 800a. Either of the embodiments shown would be welded, for example, to a front facing portion of cross arm assembly 120. The purpose of latch elements 800 or 800a is to remove slack from and maintain a safety line or chain in a taut condition after a chain has been passed under cross arm assembly 120 or directly up to the chassis frame forward of the axle of the vehicle being towed ("forward meaning in a direction toward the towing vehicle). The safety line latch 800 or 800a is the subject of a co-pending application to T. D. Thomison filed of even date with this application and entitled SAFETY LINE LATCH FOR USE WITH TOWING SYSTEMS Ser. No. 312,528, filed Feb. 21, 1989.

The safety line latches (800 and 800a in FIG. 2 and 800-1 and 800-2 in FIG. 8) include a base member 802 and a latching member 804. The base member 802 is affixed to the slidable cross arm tube or sleeve 402 on the cross arm member 120. The base member 802 has a slot-shaped aperture 806 therein in which the safety line 910a, 910b can be positioned. The latching member 804 is movable from a first position, as shown in FIG. 2, allowing entry and removal of the safety line, to a second position, as shown in FIG. 8, preventing removal of the safety line.

A more detailed discussion of an illustrative embodiment of the quick connect/disconnect socket coupling arrangement between a wheel cradle and the cross arm is best set forth with reference to FIGS. 3, 4 and 5. In FIG. 3, latch 153 is shown in two alternative positions. In a first position, latch 153 has its latch pin engaging notch 308 surrounding a portion of the periphery of a latch engaging pin 162 carried by side arm outer tube 160. In its released position, latch 153 is shown rotated away from latch engaging pin 162, the rotation being affected about an axis passing through the center of a latch pivot pin 310. Latch 153 is biased to its closed position via a torsion spring 312 surrounding latch pivot pin 310. Latch 153 additionally comprises a ramp angle or camming surface 314 against which latch engaging pin 162 bears upon laterally inwardly sliding motion of outer tube 160. Upon such inward motion, latch pin 162 will ride up camming surface 314, thereby forcing latch 153 to pivot about pivot pin 310 until the latch pin engaging notch 308 is encountered, whereupon latch 153 will, under the force of torsion spring 312, snap back to the closed position thereby releasably coupling outer tube 160 of side arm assembly 165 into socket assembly 150a. Latch 153 is limited in its angular swing by latch stop angle member 360.

In the latched position, latch release lever portion 304 of latch 153 will protrude through access window 164 formed in outer tube 160 for manual access and movement whenever it is desired to release side arm assembly 165 from its socket. Such release, as will be apparent from FIG. 3, will be effected upon a counterclockwise rotation of latch 153 via release lever 304 to disengage latch pin engaging notch 308 from latch engaging pin 162, thereby enabling the retraction outwardly in a lateral direction of outer tube 160 of side arm assembly 165.

Figure 5:
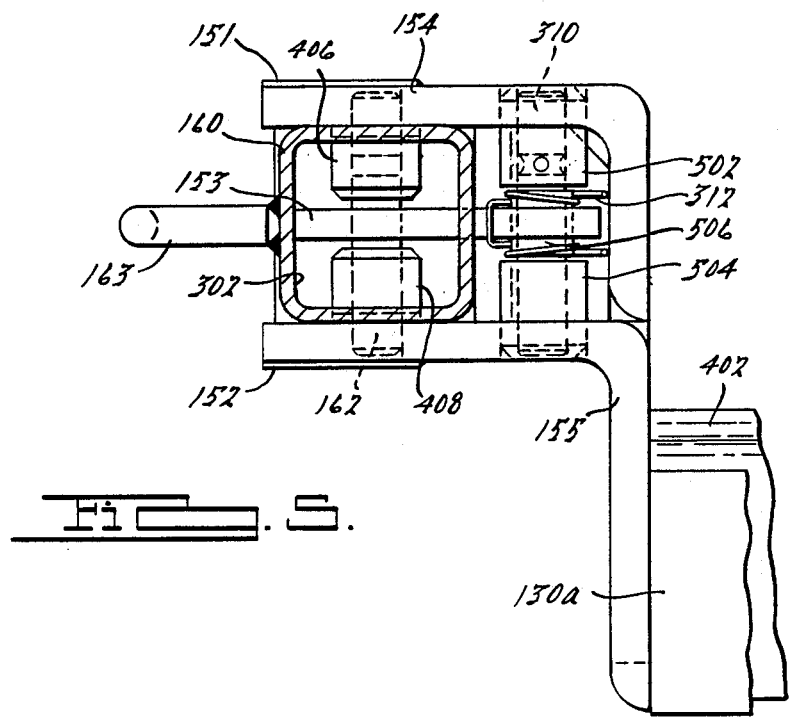
FIG. 5 is an end view taken along arrow 5 of FIG. 4.

As seen from FIGS. 3, 4 and 5, the socket is basically formed by the intersection of top angle member 154, center angle member 156, and base angle member 155, thereby forming a substantially rectanguloid cavity having a laterally outwardly facing open surface and a rearwardly facing open surface for mating receipt of outer tube 160.

As will also be apparent from FIGS. 3-5, outer tube 160 may be moved to a plurality of angular positions relative to cross arm assembly 120. However, these adjustment positions are only possible in an inward direction towards the vehicle to be towed—i.e., only for angles of 90° or less of the side arm assembly with respect to the cross arm assembly 120. As seen from FIG. 3, surface 340 on center angle 156 which abuts lateral surface 350 of cross arm 160 in its 90° position relative to the cross arm, prevents outward rotation of the side arm assembly 165 to an angle of greater than 90° with respect to cross arm assembly 120.

Top angle member 154 and base angle member 155 have respective latch engaging pin entry slots 306 and 307 which are vertically aligned for sliding lateral receipt of latch engaging pin 162. Slots 306 and 307 have respective cover plates 151 and 152 welded over the outer facing surfaces of the pin receiving slot to enable easier manufacture of the socket entry slot in the respective angle members. Cover plates 151 and 152 additionally protect the pin carried by the side arm assembly and add strength back to the angle members where the slots were formed.

As seen in FIG. 4, latch engaging pin 162 is carried within outer tube 160 of slide arm assembly 165 via engaging pin bosses 406 and 408.

Welded to a flange of base angle 155 is an outer cross arm tube or sleeve 402 of cross arm assembly 120 having an inner cross arm tube receiving chamber 404. Additionally welded to base angle flange 155 is an end of approach plate 130a. The outer cross arm tube 402 telescopically receives an inner tube (not specifically shown) for sliding engagement therewith whereby the entire weldment of the socket assembly and approach plate can slide on the inner cross tube of the cross arm assembly 120 for accommodating various wheel axle widths of a vehicle to be towed.

As seen in FIG. 5, latch pivot pin 310 is carried in the socket between top angle member 154 and base angle member 155 via pivot pin bosses 502 and 504, respectively. Surrounding latch pivot pin 310 in the area of its engagement with latch 153 is a latch mandrel 506 and the torsion spring 312, previously described with reference to FIG. 3.

Handle 163 extends over the latch lever and its access window in outer tube 160 to prevent debris from entering the socket and to avoid unintentional disconnecting of the wheel cradle assembly from the cross arm socket.

Outer tube 160 of side arm assembly 165, as shown in FIG. 5, provides an inner tube receiving chamber 302 for inner tube 170 of FIG. 2.

With the arrangement as shown in FIGS. 2-5, enabling quick connect and disconnect coupling via laterally inwardly sliding and outwardly sliding motion of the side arm assembly 165 relative to ends of the cross arm assembly 120 enables easy use of the apparatus of the invention in those situations where side clearance adjacent outer side surfaces of the wheels of the towed vehicle is not available. One such situation, for example, would be where the vehicle to be towed has at least one of its wheels directly adjacent a curb. For curb heights of approximately five inches or less, the sockets are high enough to enable wheel cradle coupling to the cross arm without obstruction. For curb heights over approximately five inches, the cross arm assembly 120 would be raised, for example, by the telescopic tow bar 110 of FIG. 1 to a height where the socket would be above the curb. At this point, the side arm assemblies may be easily slid into their respective sockets from laterally outwardly of the towed vehicle and the wheel engaging shoes 190 positioned immediately behind the towed wheel generally opposite to approach plates 130 of FIG. 1 or FIG. 2. Shoes 190 may be provided with appropriately shaped surfaces matching the general outer contour of the towed vehicle wheel such that the wheels may be appropriately grasped even in the increased upward position of the wheel cradles required in the towing situation where the curb height exceeds five inches.

Figure 6:
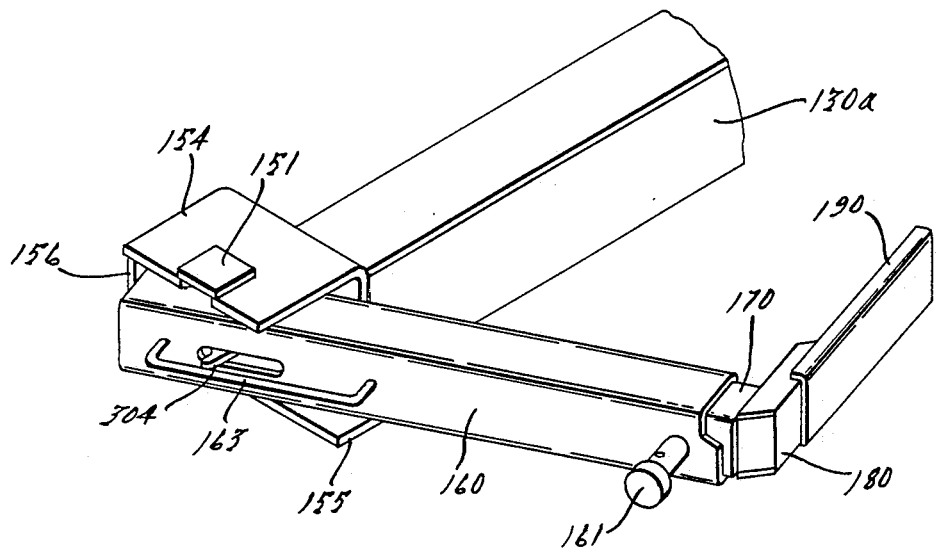
FIG. 6 is a perspective view of a wheel cradle in an inwardly rotated position relative to the cross arm assembly.
Figure 7:
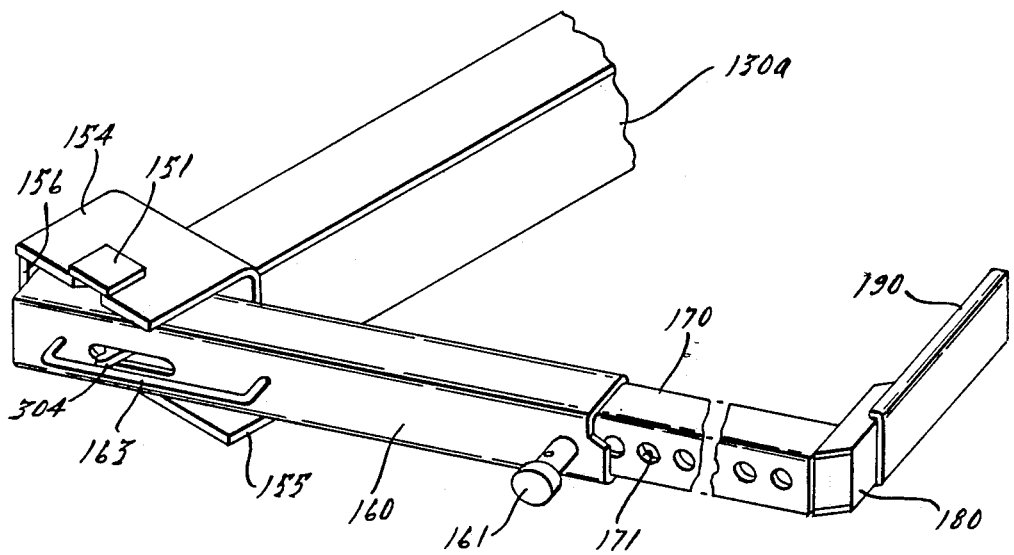
FIG. 7 is a perspective view of a wheel cradle with its side arm assembly extended lengthwise and rotated inwardly of the cross arm assembly.

Further optional adjustable features of the wheel cradles of the invention are depicted in FIGS. 6 and 7. In FIG. 6, side arm outer tube 160 is shown positioned in its socket at an angle of less than 90° relative to the approach plate 130a and hence cross arm assembly 120.

In FIG. 7, outer tube 160 is not only shown in an inwardly directed position in a horizontal plane but is additionally shown having the length of the side arm assembly 165 increased by pulling out on plunger pin 161 and sliding inner tube 170 outwardly of the cross arm whereupon the adjusted length may be locked in place by releasing plunger pin 161 such that it will engage a preselected one of a plurality of holes 171 formed in inner tube 170. The length of cross arm assembly 120 may be similarly adjusted by sliding an outer tube carrying approach plates 130a or 130 along an inner tube of cross arm assembly 120. This arrangment is also locked in a chosen position via plunger pins engaging appropriately formed holes in an inner tube of cross arm assembly 120. The outer cross tubes of cross arm assembly 120 are locked in chosen positions by T-handle set set screws and have built-in safety locks for preventing inadvertent removal of the outer cross tubes from the inner tube of the cross arm assembly. Since the arrangement is essentially identical to that shown for side arm assembly 165, the details of the arrangement for the cross arm adjustability are not shown in the drawings.

FIG. 8 sets forth a safety line or safety chain routing arrangement of the invention. Components of the towing system which are identical to those set forth in FIG. 1 bear like reference numerals.

As seen from FIG. 8, the towing vehicle 100 includes first and second storage compartments 901a and 901b for receipt of an unused end portion of the safety chain 910a or 910b. The keyhole shaped aperture enables the safety chain to be temporarily latched at a preselected position along its length by forcing the chain into a narrower portion 903a or 903b of the aperture.

The safety chain is then routed via a guide ring 920a or 920b, the guide rings being coupled at generally opposite lateral surfaces of the tow bar 110. Each guide ring has a central aperture through which the respective safety chain passes in a lengthwise manner as shown in FIG. 8.

The free end of each chain 910a or 910b carries a suitable hook such as a conventional "R-hook" 930a or 930b for attachment to the chassis 950 of the towed vehicle 951, preferably at a point forward of the towed vehicle's axis 952 closest to the cross arm 120. Also, in a preferable mounting arrangement, the safety chain is passed underneath the cross arm 120 on its way to its attachment point at the chassis. After the chains are hooked to the towed vehicle chassis, they are pulled to a taut position with respect to the cross arm 120 by placing the safety chains at a predetermined position within latch elements 800-1 or 800-2. Latch elements 800-1 and 800-2 could, for example, take the form disclosed in the above-mentioned co-pending application to T. D. Thomison.

The desired degree of slack in the safety chains between tow bar 120 and the storage compartments is then selected by placing the safety chain at a preselected lengthwise position with respect to the storage compartment apertures 902a and 902b and then forcing the chains into the narrower portions 903a and 903b of those apertures.

The guide elements or rings 920a and 920b help avoid excess slack and additionally help maintain the proper slack upon towing vehicle cornering.

The invention has been described with reference to an illustrative embodiment, the details of which are given for the sake of example only. The scope and spirit of the invention is defined by the appended claims.

What is claimed is:

1. In a wheel lift towing system including a towing vehicle having a front end and a rear end and having a tow bar pivotally coupled to a cross arm for carrying wheel engaging cradles at opposite end portions thereof, said tow bar extending rearwardly from said towing vehicle substantially horizontally and substantially along the longitudinal axis of said towing vehicle, an arrangement for coupling a back-up safety line, such as a safety chain, between the towing vehicle and a towed vehicle situated in said wheel engaging cradles, the arrangement comprising:
 a first storage compartment in the rear end of said towing vehicle having a keyhole shaped aperture therein for lengthwise receiving and latching of an unused portion of a first safety line;
 first guide means positioned on said tow bar and having an aperture through which the first safety line is routed; and
 first latching means positioned on said cross arm for receipt of the first safety line at a predetermined position along its length after a free end of the first safety line has been coupled to the towed vehicle.

2. The arrangement of claim 1 further including:
 a second storage compartment in the rear end of said towing vehicle having a keyhole shaped aperture therein for lengthwise receiving and latching of an unused portion of a second safety line;
 second guide meas positioned on said tow bar at a point generally opposite the first guide means and having an aperture through which the second safety line is routed; and
 second latching means positioned on said cross arm at a point displaced from a midpoint of the cross arm and generally symmetrical to a coupling point for the first latching means with respect to the midpoint, the second latching means receiving the second safety line at a predetermined position along its length after a free end of the second safety line has been coupled to the towed vehicle.

3. The arrangement of claim 1 wherein the free end of the first safety line is coupled to the towed vehicle chassis between the cross arm and an axle of the towed vehicle closest to the towing vehicle.

4. The arrangement of claim 2 wherein the free ends of the first and second safety lines are coupled to the towed vehicle chassis between the cross arm and an axle of the towed vehicle closest to the towing vehicle.

5. A safety line system for a wheel lift assembly for a towing vehicle for lifting and towing a towed vehicle, said towing vehicle having a front end and a back end, said system and assembly comprising:
 (a) a pair of safety line storage compartments in said back end of said towing vehicle, said storage compartments having outlets with safety line affixation means thereon;
 (b) a tow bar assembly affixed to the back end of said towing vehicle and extending rearwardly therefrom in a direction substantially along the longitudinal axis of said vehicle;
 (c) said tow bar assembly having a first section permanently affixed to said vehicle and a second section positioned within said first section in a telescoping relationship, said second section having an outer end,
 (d) a pair of safety line guide means attached to said first section of said tow bar assembly.
 (e) a cross arm member pivotally attached to said outer end of said second section of said tow bar assembly,
 (f) a pair of latch means attached to said cross arm member on opposite sides of said attachment of said second section of said cross arm member,
 (g) wheel cradle means positioned on said cross arm member for holding wheels of said towed vehicle and lifting said towed vehicle,
 (h) a pair of safety line means stored in said storage compartments for being pulled out, passed through said guide means, positioned in said latch means and attached to said towed vehicle,
 (i) said latch means comprising means for securely holding said safety line means in position,
 (j) whereby said safety line means when attached to said towed vehicle, affixed in said latch means, passed through said guide means and affixed to said outlet of said storage compartments, provides a back-up holding and towing means for said towed vehicle.

6. The system and assembly of claim 5 wherein said safety line means comprises a pair of safety chains and said affixation means on said outlets of said storage compartment comprise keyhole shaped apertutes.

7. The system and assembly of claim 5 wherein said guide means is used to avoid excess slack of said safety line means and to help maintain proper slack of said safety line means upon cornering of the towing vehicle.

8. The system and assembly of claim 5 wherein said latch means each comprise a first member attached to said cross arm member and a movable second member, said first member having a slotted aperture therein for holding said safety line means, and said second member being pivotally affixed to said first member and movable between a first position allowing entry and removal of said safety line means in said aperture and a second position preventing removal of said safety line means.

9. A safety line system for a towing vehicle, the towing vehicle having a rear end, said system comprising:
(a) safety line means,
(b) storage means in said rear end of said towing vehicle for storing an unused portion of said safety line means, said storage means having outlets with affixation means thereon;
(c) a tow bar assembly affixed to the rear end of said towing vehicle for lifting and towing a towed vehicle,
(d) said tow bar assembly affixed to said towing vehicle and having an outer end,
(e) guide means on said tow bar assembly for holding said safety line means,
(f) a cross arm member attached to said tow bar assembly,
(g) latch means on said cross arm member for securely holding said safety line means in place, and
(h) lift means on said cross arm member for lifting said towed vehicle,
(i) said safety line means stored in said storage means adapted to be pulled out therefrom, passed through said guide means, positioned in said latch means and attached to said towed vehicle,
(j) whereby said safety line means when attached to said towed vehicle, affixed in said latch means, passed through said guide means and affixed to said outlet of said storage means, provides a back-up holding and towing means for said towed vehicle.

10. The system of claim 9 wherein said safety line means comprises a pair of safety chains and said affixation means on said outlets of said storage means comprise keyhole shaped apertures.

11. The system of claim 9 wherein said guide means is used to avoid excess slack of said safety line means and to help maintain proper slack of said safety line means upon cornering of the towing vehicle.

12. The system of claim 9 wherein said latch means comprises a first member attached to said cross arm member and a movable second member, said first member having a slotted aperture therein for holding said safety line means, and said second member being pivotally affixed to said first member and movable between a first position allowing entry and removal of said safety line means in said aperture and a second position preventing removal of said safety line means.

* * * * *

UNITED STATES PATENT AND TRADEMARK OFFICE
CERTIFICATE OF CORRECTION

PATENT NO. : 4,958,980
DATED : September 25, 1990
INVENTOR(S) : Gerald E. Holmes and Fleming V. Cannon It is certified that error appears in the above-identified patent and that said Letters Patent is hereby corrected as shown below:

ON TITLE PAGE:

Title should be --SAFETY LINE SYSTEM FOR TOWING VEHICLES--

Column 7, line 59; "meas" should be --means--.

Column 8, line 55; "apertutes" should be --apertures--.

Signed and Sealed this

Second Day of June, 1992

Attest:

DOUGLAS B. COMER

*Attesting Officer*  *Acting Commissioner of Patents and Trademarks*